United States Patent
Nelson

(10) Patent No.: US 8,146,985 B2
(45) Date of Patent: Apr. 3, 2012

(54) DOOR SEAL SYSTEMS AND METHODS FOR TEMPERATURE-CONTROLLED CARGO CONTAINERS

(75) Inventor: Chad Nelson, Rice Lake, WI (US)

(73) Assignee: FG Products, Inc., Rice Lake, WI (US)

( * ) Notice: Subject to any disclaimer, the term of this patent is extended or adjusted under 35 U.S.C. 154(b) by 433 days.

(21) Appl. No.: 12/507,941

(22) Filed: Jul. 23, 2009

(65) Prior Publication Data

US 2011/0018205 A1    Jan. 27, 2011

(51) Int. Cl.
*B60J 7/00* (2006.01)
(52) U.S. Cl. .................. 296/146.8; 49/482.1; 49/483.1; 160/229.1
(58) Field of Classification Search ............... 296/24.35, 296/24.41, 146.8, 146.9; 49/475.1, 480.1, 49/482.1, 483.1, 484.1, 489.1; 160/229.1
See application file for complete search history.

(56) References Cited

U.S. PATENT DOCUMENTS

| | | | |
|---|---|---|---|
| 723,231 A | 3/1903 | Benedict | |
| 1,061,974 A | 5/1913 | Bohn | |
| 1,193,255 A | 8/1916 | Gibbs | |
| 1,896,198 A | 2/1933 | MacMillan | |
| 1,970,610 A | 8/1934 | McMullen et al. | |
| 2,324,721 A | 7/1943 | O'Connor | |
| 2,346,853 A | 4/1944 | Lundvall | |
| 2,752,864 A | 7/1956 | McDougal, Sr. et al. | |
| 2,866,419 A | 12/1958 | Candlin, Jr. | |
| 2,895,431 A | 7/1959 | Ford | |
| 3,017,843 A | 1/1962 | Loomis et al. | |
| 3,057,284 A | 10/1962 | Learmont | |
| 3,070,044 A | 12/1962 | Tobin | |
| 3,162,146 A | 12/1964 | Knippel et al. | |
| 3,217,664 A | 11/1965 | Aquino et al. | |
| 3,413,932 A | 12/1968 | Bennett | |
| 3,438,149 A | 4/1969 | Ilg | |
| 3,680,492 A | 8/1972 | Weage | |
| 4,019,442 A | 4/1977 | Lee et al. | |
| 4,049,311 A | 9/1977 | Dietrich et al. | |
| 4,265,577 A | 5/1981 | Loomis | |
| 4,281,870 A | 8/1981 | Ehrlich et al. | |
| 4,511,173 A * | 4/1985 | Wentzel .................. | 296/156 |
| 4,639,031 A | 1/1987 | Truckenbrodt | |

(Continued)

FOREIGN PATENT DOCUMENTS

DE    298 20 764    2/1999

(Continued)

OTHER PUBLICATIONS

Trade Literature describing Randall Bulkhead Systems believed to have been offered for sale prior to Jul. 20, 2001.

(Continued)

*Primary Examiner* — Joseph Pape
(74) *Attorney, Agent, or Firm* — Oblon, Spivak, McClelland, Maier & Neustadt, L.L.P.

(57) ABSTRACT

Some embodiments of a cargo container door seal system can provide seal members to hinder leakage of conditioned air along the top edge and the side edges of an access door of a temperature-controlled cargo container. For example, the seal system may include mating seal members proximate to a top edge of a roll-up door of a refrigerated trailer, and may also include flexible side seal members proximate to the left and right side edges of the roll-up door.

20 Claims, 4 Drawing Sheets

U.S. PATENT DOCUMENTS

| | | | |
|---|---|---|---|
| 4,860,813 A * | 8/1989 | Ballyns et al. | 160/188 |
| 4,880,342 A | 11/1989 | Pradovic | |
| 4,886,404 A | 12/1989 | Jensen et al. | |
| 5,010,943 A | 4/1991 | Boyer | |
| 5,161,848 A | 11/1992 | Lutton | |
| 5,265,993 A | 11/1993 | Wayne | |
| 5,435,104 A * | 7/1995 | Dietrich | 49/493.1 |
| 5,501,503 A * | 3/1996 | Thayer | 296/146.8 |
| 5,664,386 A | 9/1997 | Palmersten | |
| 5,704,676 A | 1/1998 | Hill | |
| 5,984,601 A | 11/1999 | Jevaney et al. | |
| 6,017,175 A | 1/2000 | Kassab et al. | |
| 6,247,740 B1 | 6/2001 | Smith | |
| 6,626,625 B2 | 9/2003 | Nelson et al. | |
| 6,923,610 B2 | 8/2005 | Nelson et al. | |
| 7,195,435 B2 | 3/2007 | Clark | |
| 7,214,017 B2 | 5/2007 | Nelson et al. | |
| 7,338,239 B2 | 3/2008 | Nelson et al. | |
| 7,445,412 B2 | 11/2008 | Nelson et al. | |
| 2009/0041558 A1 | 2/2009 | Nelson et al. | |

FOREIGN PATENT DOCUMENTS

| | | |
|---|---|---|
| GB | 2238988 | 6/1991 |

OTHER PUBLICATIONS

Trade Literature describing Tempar Bulkhead Systems believed to have been offered for sale prior to Jul. 20, 2001.

Trade Literature describing ROM Bulkhead Systems believed to have been offered for sale prior to Jul. 20, 2001.

Trade Literature describing Bulkhead Seals believed to have been offered for sale prior to Jul. 20, 2001.

Trade Literature describing Donovan Bulkhead Systems believed to have been offered for sale prior to Jul. 20, 2001.

Trade Literature describing FG Products Bulkhead Systems believed to have been offered for sale prior to Jul. 20, 2001.

Trade Literature describing ISOWALL Insulation Parition Walls believed to have been offered for sale prior to Jul. 20, 2001.

Trade Literature describing LOAD-LOK Cargo Restraint Systems believed to have been offered for sale prior to Jul. 20, 2001.

Trade Literature describing Schmitz Cargobull Bulkhead Systems believed to have been offered to sale prior prior to Jul. 20, 2001.

Advertisement for "Floater II Insulated Bulkhead" by F/G Products, Refrigerated Transporter, Feb. 1995, p. 57.

Advertisement for Flex-Lite: and "Floater II" by F/G Products, Refrigerated Transporter, Jun. 1996, p. 65.

Advertisement for "The Loadmaker by ROM" Refrigerated Transporter, Feb. 1987, p. 49.

Advertisement for "The Loadmaker with DuroSeal Protection" Refrigerated Transporter, Feb. 1997, p. 21.

Advertisement for "The Tough One" by Randall Industries, Refrigerated Transport, Dec. 1994, p. 25.

Moveable Bulkheads for Multi-Temperature Service:, Refrigerated Transport, Nov. 1978, pp. 93-95.

Tesco Turns Inventory From Vendors to Store Shelves on a 30-Hour Cycle, Refrigerated Transport Jan. 1997 p. 12-13.

Advertisement for "Insulated Products", by Donovan, Refrigerated Transport, Apr. 1997, p. 27.

FG Products, "Insulated Bulkheads," 7pages (2001).

FG Products, "Floater II Insulated Bulkhead," 1page (2005).

FG Products, "Re-Flex Insulated Bulkhead," 1page (2005).

FG Products, "Center Partition Systems—Designed for positive temperature control," 3 pages (1997).

* cited by examiner

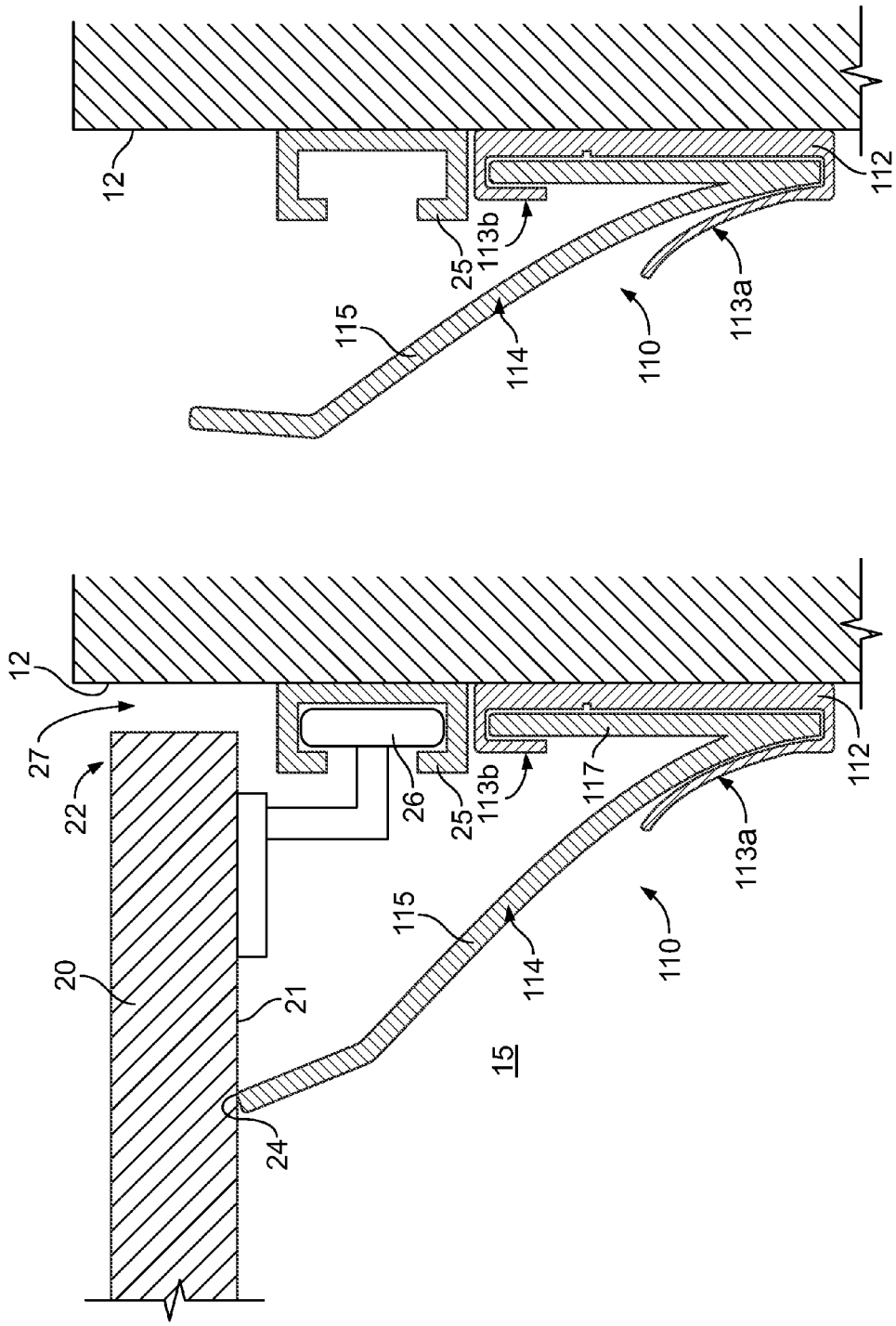

DOOR SEAL SYSTEMS AND METHODS FOR TEMPERATURE-CONTROLLED CARGO CONTAINERS

TECHNICAL FIELD

This disclosure relates to climate controlled cargo spaces, such as a seal system for an access door of a temperature-controlled cargo container.

BACKGROUND

Temperature-controlled cargo containers, such as refrigerated trailers, railcars, and other containers, are commonly used to transport food products and other temperature-sensitive products. A refrigerated trailer generally includes a refrigeration unit mounted to the front wall of the trailer with inlet and outlet portions protruding into the interior of the trailer. The outlet of the refrigeration unit forces cooled air into the trailer near the ceiling of the trailer, thus causing the cooled air to cycle through the trailer.

In some circumstances, the cargo area adjacent the access door at the rear of the cargo container is maintained at controlled temperature. For example, such a cargo area extends from a roll-up trailer door to a bulkhead or partition wall which in turns defines another cargo area which is controlled to be at a different temperature and/or humidity. Air gaps and other unsealed perimeters around the access door can permit the temperature-controlled air to escape, thereby causing a greater burden on the climate control system to maintain the cargo area at the selected temperature range. If the leakage of the temperature-controlled air becomes too great, the climate control system may not be able to maintain the cargo area at the selected temperature range, which may in turn cause damage or deterioration of temperature-sensitive cargo such as perishable food items.

The leakage of temperature-controlled air may be particularly pronounced in cargo containers having roll-up doors. In some circumstances, a roll-up door may move up and down during transport (in response to movement of the cargo container), causing edge seals to temporarily separate from abutment with the rear portal edge of the cargo container. Not only can such movement create gaps along the side edges of the door, but air gaps along a top edge of the door can be noticeable in size and cause leakage of the temperature-controlled air from the cargo container.

Some temperature-controlled trailers are equipped with flexible side seals that are directly mounted to the side walls of the trailer via a set of rivets or other fasteners. In particular, each side seal is held in a desired position by a user while the rivets or fasteners are advanced into the side wall using a handheld tool. The flexible side seals extend from the side walls, over the tracks of the roll-up access door adjacent to the side edges of the access door, and to abutment with an interior face of the access door.

SUMMARY

Some embodiments of a cargo container door seal system can provide seal members to hinder leakage of conditioned air along the top edge and the side edges of an access door of a temperature-controlled cargo container. For example, the seal system may include mating seal members proximate to a top edge of a roll-up door of a refrigerated trailer, and may also include flexible side seal members proximate to the left and right side edges of the roll-up door (when the door is in a closed position). The mating seal members can include an upper door seal member mounted to an interior face of the access door proximate to the top edge and a complementary seal mounted to a ceiling of the refrigerated trailer. Each of the side seal members can be toollessly mounted to a side wall of the refrigerated trailer so that a user can readily replace one or both of the side seal members without tools to remove or insert fasteners. For example, generally rigid brackets can be affixed to the side walls of the trailer so as to slidably and releasably receive the flexible side seal members. When the flexible side seals become damaged or worn, they can be readily removed from the generally rigid brackets along the trailer side walls (without the use of handheld tools to remove rivets or other fasteners. Thereafter, replacement side seals can be slidably inserted into the generally rigid brackets along the trailer side walls.

Particular embodiments described herein include a door seal system for a roll-up access door in a refrigerated trailer. The system may include a roll-up access door movably mounted in guide tracks of a refrigerated trailer and being adjustable between an open position in which the access door is arranged in a generally horizontal elevated position and a closed position in which the access door is arranged in a generally vertical position proximate to a rear of the trailer. The system may also include an upper seal assembly comprising a door-mounted seal member and a ceiling-mounted seal member that releasably engage one another along a generally horizontal seal interface proximate to a top edge of the access door when the access door is adjusted to the closed position. The system may further include a first side seal assembly comprising a first generally rigid elongate bracket mounted to a first side wall of the trailer in a generally vertical orientation and a first flexible seal member slidably and removably engaged with the first generally rigid elongate bracket. The first flexible seal member may extend from the first generally rigid elongate bracket, over one of the guide tracks, and into contact with an interior face of the access door when the access door is in the closed position. The system may also include a second side seal assembly comprising a second generally rigid elongate bracket mounted to a second side wall of the trailer in a generally vertical orientation and a second flexible seal member slidably and removably engaged with the second generally rigid elongate bracket. The second flexible seal member may extend from the second generally rigid elongate bracket, over another of the guide tracks, and into contact with the interior face of the access door when the access door is in the closed position.

In some embodiments, a door seal system for use in a refrigerated trailer may include a first upper seal member having a flexible elongate body at least partially defined by a door flange portion directly mountable to an interior face of an access door at a rear of a trailer and a first upper seal flap extending transversely from the door flange portion. The system may also include a second upper seal member having a flexible elongate body at least partially defined by a ceiling flange portion directly mountable to a ceiling of the trailer and a second upper seal flap extending transversely from the ceiling flange portion. The first and second seal flaps may engage one another to provide a generally horizontal seal interface proximate to a top edge of the access door when the door flange portion is mounted to the access door of the trailer and the ceiling flange portion is mounted to the ceiling of the trailer. The system may further include a first side seal assembly comprising a first generally rigid elongate bracket mountable to a first side wall of the trailer and a first side seal member slidably and removably engaged within a first channel of the first generally rigid elongate bracket. When the first generally rigid elongate bracket is mounted in a generally vertical orientation along the first side wall, the first side seal member may extend over a first guide track and into contact with the access door in the trailer. The system may also include a second side seal assembly comprising a second generally rigid elongate bracket mountable to a second side wall of the trailer and a second side seal member slidably and removably engaged within a second channel of the second generally rigid elongate bracket. When the second generally rigid elongate bracket is mounted in a generally vertical orientation along the second side wall, the second side seal member may extend over a second guide track and into contact with the access door in the trailer.

In particular embodiments, a method of using a door seal system in a refrigerated trailer includes mounting a first upper seal member to an access door in a rear portion of a trailer. The first upper seal member may have a flexible elongate body at least partially defined by a door flange portion directly mounted to the access door and a first upper seal flap extending transversely from the door flange portion. The method may also include mounting a second upper seal member to a ceiling of the trailer. The second upper seal member may have a flexible elongate body at least partially defined by a ceiling flange portion mounted to the ceiling and a second upper seal flap extending transversely from the ceiling flange portion. The method may further include mounting a first side seal assembly to a first side wall of the trailer proximate to a first guide track for the access door. The first side seal assembly may comprise a first generally rigid elongate bracket mounted to the first side wall of the trailer and a first side seal member slidably and removably engaged within a first channel of the first generally rigid elongate bracket. The method may also include mounting a second side seal assembly to a second side wall of the trailer proximate to a second guide track for the access door. The second side seal assembly may comprise a second generally rigid elongate bracket mounted to the second side wall of the trailer and a second side seal member slidably and removably engaged within a second channel of the second generally rigid elongate bracket. The method may further include adjusting the access door of the trailer to a closed position so that the first and second upper seal flaps engage one another to provide a generally horizontal seal interface proximate to a top edge of the access door. The first side seal member may extend over the first guide track and into contact with the interior face of the access door when the access door is adjusted to the closed position. The second side seal member may extend over the second guide track and into contact with the interior face of the access door when the access door is adjusted to the closed position.

These and other embodiments described herein may provide some or all of the following advantages. First, the cargo container door seal system can reduce the loss of conditioned air through air gaps along the peripheral edges of an access door of a temperature-controlled cargo container. Second, some embodiments of the door seal system may be particularly suited to operate with a roll-up access door at a rear portal of a refrigerated trailer. For example, the upper mating seals proximate to the top edge of the roll-up door can hinder leakage of conditioned air along the top edge of the roll-up door while also avoiding interference with the door-lift mechanism arranged immediately above the roll-up door (when in a closed position). In another example, the flexible side seals can hinder leakage of conditioned air along the side edges of the roll-up door while also avoiding interference with the guide rails to the side of the roll-up door. Third, each of the side seal members can be toollessly mounted to a side wall of the cargo container so that a user can readily replace one or both of the side seal members without tools to remove or insert fasteners. Accordingly, then the flexible side seals become damaged or worn, they can be promptly removed by a worker, and replacement side seals can be removably mounted to the side walls in a timely manner without requiring specialized tools to remove rivets or other fasteners.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A-2B are cross-section top views of a portion of the door seal system of FIG. 1, with an access door in different positions.

Like reference symbols in the various drawings indicate like elements.

DETAILED DESCRIPTION OF ILLUSTRATIVE EMBODIMENTS

Figure 1:
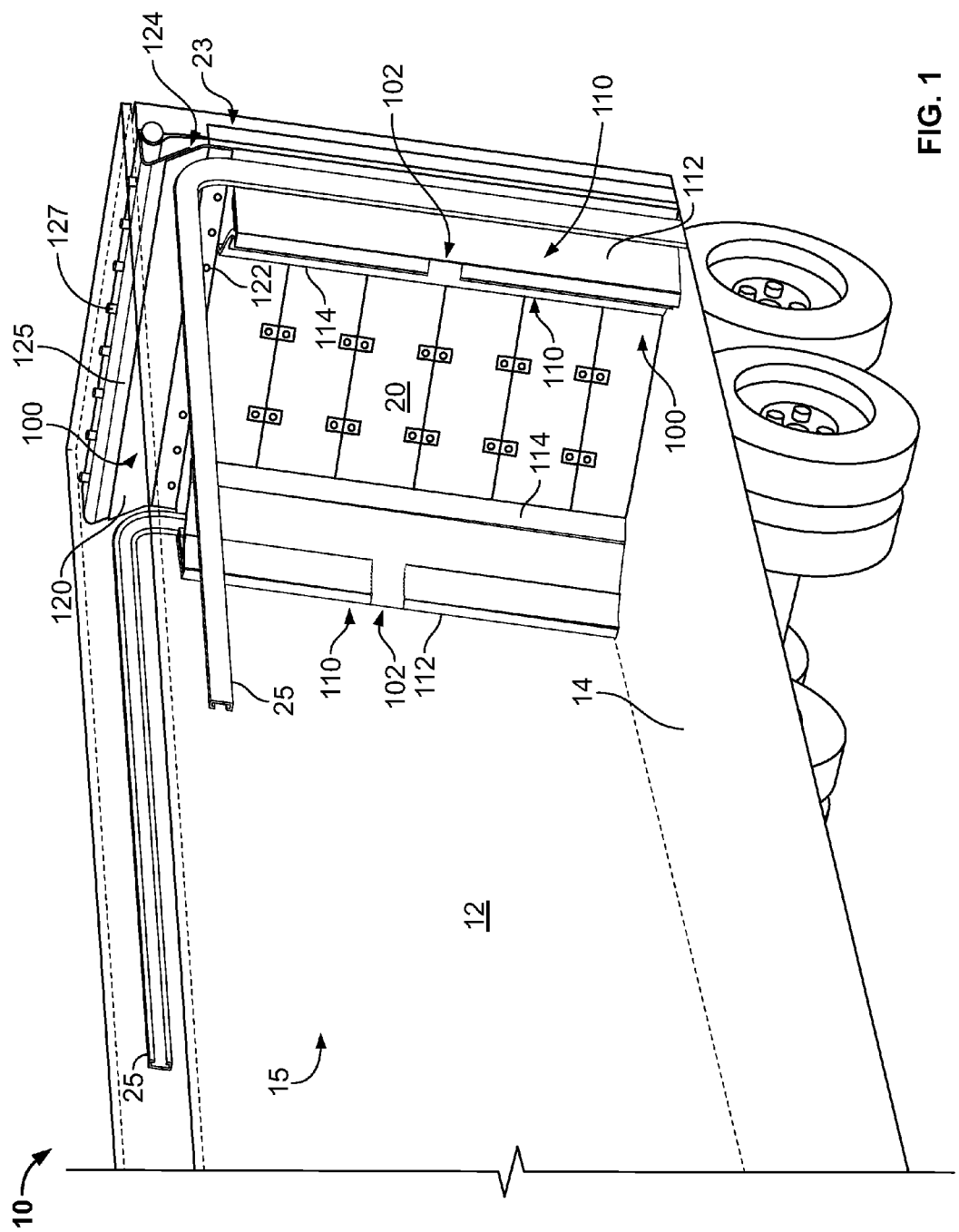
FIG. 1 is a perspective view of a door seal system for a temperature-controlled cargo container, in accordance with some embodiments.

Referring to FIG. 1, a temperature-controlled cargo container 10, such as a trailer or railcar, can enclose a cargo space 15 used for the transport of perishable items or other temperature-sensitive items. In the depicted embodiment, the temperature-controlled cargo container is a refrigerated trailer 10 configured to transport the cargo items over road surfaces. The refrigerated trailer 10 may include a refrigeration unit (not shown in FIG. 1) mounted to a front wall opposite to a rear access door 20. In some embodiments, one or more of the items transported within the cargo space 15 may be may be maintained at temperatures that are different than the ambient temperature outside of the trailer 10. For example, items in the trailer 10 may be required to be stored at temperatures below the freezing point of water (e.g., a "frozen trailer") or may be required to be stored at temperatures that are above freezing, but are below ambient temperatures (e.g., a "refrigerated trailer"). In other embodiments, separation into zones may be done to provide for different temperature zones within the trailer 10. For example, the trailer 10 may contain more than one climate controlled zone, including a "frozen" zone and a "refrigerated" zone, with or without a zone kept at an ambient temperature.

In some embodiments, it can be advantageous to reduce heat transfer between the cargo space 15 and the ambient air outside of the trailer 10. For example, when transporting frozen goods in the trailer 10, heat can be transferred from the external environment (e.g., outside of the trailer 10) into the cargo space 15 while conditioned air leaks out of the cargo space 15. Reducing the amount of heat that is transferred into the cargo space 15 can reduce the amount of energy expended to maintain the cargo space 15 at a predetermined temperature. In some embodiments, the trailer 10 can be equipped with a door seal system 100 configured to reduce the leakage of cooled or otherwise conditioned air through air gaps along the periphery of the access door in the rear of the trailer 10.

Still referring to FIG. 1, the access door 20 may comprise a roll-up overhead door that travels along roller tracks 25 mounted to the trailer walls. The manufacturing tolerances of trailers and overhead doors can lead to small gaps of different sizes between trailers and their corresponding overhead doors, and vibration and movement of each trailer while traveling on roads can cause the individual gaps to temporarily increase in size or cause new air gaps to form. As such, the system 100 may include flexible seal members configured to accommodate and seal the gap sizes along the periphery of the access door 20. Some or all of the flexible seal members of the system 100 may be readily replaced without requiring the removal or insertion of rivets or other fasteners. Accordingly, some embodiments of the system 100 with readily replaceable seal members can advantageously reduce the time and labor costs associated with the replacement of sealing components and can encourage the timely replacement of worn seals. Timely replacement of worn seals can reduce the amount of conditioned air that leaks out of the cargo space 15, thus reducing energy consumption and the associated costs.

Briefly, in use, as the door 20 is transitioned from a elevated, substantially horizontal, open position (shown in FIG. 4) to a substantially vertical closed position shown in (FIGS. 1 and 3A), the door 20 can abut side seal members 114 causing them to resiliently flex and form seal interfaces between the door 20 and the side seal members 114. As the door 20 approaches the closed position, a top door-mounted seal member 120 engages with a complementary ceiling-mounted seal member 125, thereby forming a generally horizontal seal interface proximate to a top edge of the access door 20. After repeated movements of the door 20 between the open and closed positions, at least a portion of the seal members 114 can become worn. In order to maintain the ability to form a seal interface proximate to the side edges 22 of the door 20, the side seal members 114 can be promptly removed and replaced without the need for removing rivets or other fasteners. The door seal system 100 can be configured such that the side seal members 114 are slidably and removably received in elongate brackets 112 (as described below in connection with FIGS. 3A-3B), so that a user can quickly remove and replace one or both of the side seal members 114.

Referring now to FIGS. 1 and 2A-B, the door seal system 100 can include one or more side seal assemblies 110 mounted in a generally vertical orientation to the side wall 12 of the trailer 10. The side seal assemblies 110 can be configured to reduce leakage of conditioned air along the side edges 22 of the overhead trailer door 20 when the door 20 is in a closed position (as shown in FIGS. 1 and 2A). As described in more detail in connection with FIGS. 3A-3B, when desired, one or more of the seal members 114 can be promptly replaced without the use of specialty tools to remove or insert rivets or other fasteners, thereby restoring the ability of the seal assemblies 110 to reduce leakage of the conditioned air along the side edges 22. The system 100 can also include a door-mounted seal member 120 coupled proximate to the top 23 of the trailer door 20 and a corresponding ceiling-mounted seal member 125 coupled to the ceiling of the trailer 10. In such embodiments, when the trailer door 20 is closed, the door-mounted seal member 120 can abut the ceiling-mounted seal member 125 thereby forming a seal interface 124 (as, shown, for example in FIGS. 1 and 3A), thereby hindering leakage of conditioned air along the top edge 23 of the door 20.

Still referring to FIGS. 1 and 2A-B, in some embodiments, the system 100 can include the side seal mounting brackets 112 mounted in a generally vertical orientation to the side walls 12 of the trailer 10 such that the brackets 112 are in close proximity and run parallel to the vertical portion of the trailer door tracks 25. In the depicted embodiment, the side seal mounting brackets 112 are fixedly mounted to the side walls 12 and located on the side of the trailer door track 25 opposite to the door 20. Also, the side seal mounting brackets 112 may each comprise an elongate rigid body that extends from generally adjacent to the trailer floor 14 to a vertical height that is greater than a majority of the height of the access door 20 (when the door 20 is in the closed position). This configuration of the brackets 112 can be advantageous in that trailers that were not originally equipped with side seals can be readily retrofitted to include the sealing system 100. As will be described in more detail in connection with FIGS. 3A-3B, the flexible seal members 114 can be removably installed in the elongate brackets 112 such that the seal members 114 can extend over at least a vertical portion of the door tracks 25 and the track wheels 26 (see FIGS. 2A-2B) and contact an interior face 21 of the door 20. The seal members 114 can be flexible such that when the door 20 is in the closed position shown in FIG. 1, the door 20 can cause the seal members 114 to be flexed such that they abut with the door 20 and resiliently maintain contact with the door 20, thereby forming a seal interface 24 between the free end of the seal members 114 and the door 20. The seal interface 24 can reduce the leakage of cooled or otherwise conditioned air from the cargo space 15 out to the exterior of the trailer 10 through one or more side gaps 27. (It should be understood that the air gap 27 depicted in FIG. 2A is not necessarily to scale, but is enlarged for illustrative purposes only.)

As described in more detail below, the door seal system 100 can include features that allow the system 100 to accommodate, for example, a variety of trailer heights and widths, door heights and widths, gap sizes (the size of the gaps along the side edges 22 and top edge 23 of the door 20, and the like). For example, the side seal assemblies 110 can be available in one or more lengths to accommodate trailers of different heights. In another example, the side seal assemblies 110 can be configured to be cut to length on site after the exact measurements of the trailer 10 are known. In yet another example, the seal members 114, 120, and 125 can be wide enough to accommodate a range of gap sizes between the door 20 and the trailer 10.

In some embodiments, the trailer 10 may be equipped with edge seals (not shown) as a laminated layer on the top and bottom edges of the overhead door 20. However, when the trailer 10 is in motion and the door 20 is in the closed position, normal conditions such as uneven road, cornering, and the like, can cause the trailer 10 and the overhead door 20 to move without transitioning from the closed position. Such movement of the door 20 can affect the alignment of the door 20 relative to the trailer 10 and can increase the size of gaps between the door 20 and the trailer 10 (e.g., by shifting the door 20 forward and backward relative to the trailer 10, by shifting the door sideways relative to the trailer, and the like), thus reducing the ability of laminated edge seals (e.g., the laminate layer on the top and bottom edges of the overhead door 20) to hinder the flow of conditioned air from the cargo space 15 to the exterior of the trailer 10. The seal system 100 described herein can include features that reduce the leakage of conditioned air from the cargo space 15 out to the exterior of the trailer 10, even during temporary movement of the door 20 relative to the trailer 10 during transport over road surfaces. For example, the seal members 114 and the seal assemblies 120 and 125 can be of a size and resiliency such that while the door 20 is in the closed position, movement of the door 20 relative to the trailer 10 does not disrupt the seal interfaces 24 and 124. In another example, the system 100 can be configured such that the seal interfaces 24 and 124 are located such that they are substantially unaffected by the size of the gaps between the door 20 and the trailer 10.

Referring now to FIGS. 2A-2B, each of the side seal assemblies 110 may include the rigid elongate bracket 112 (e.g., made of metal, a rigid polymeric material, or the like) and a corresponding side seal member 114. The side seal member 114 can include flexible polymeric materials such as nylon, PVC, nylon reinforced PVC, nitrile PVC, vulcanized rubber, polyethylene, urethane, urethane PVC blends, ethyl vinyl acetate (EVA), thermoplastic elastomers, thermoplastic vulcanizate (TPV), ethylene propylene diene M-class rubber (EPDM), EPDM TPV, polyester, polyolefin elastomer (POE), and combinations of the above. The side seal member 114 can abut with the interior face 21 of the door 20, forming the generally vertical seal interface 24, which hinders or otherwise reduces the flow of air through side gaps (e.g., the gap 27) between the side edges 22 of the door 20 and the trailer walls 12.

In use, the door 20 can be in the open position (refer, for example, to FIG. 4), such that the seal member 114 does not engage the door 20 (as shown in FIG. 2B). As the door 20 is transitioned from the open position to the closed position, the interior face 21 of door 20 can slidably engage at least a portion of the seal member 114 causing it to resiliently flex from the relaxed orientation shown in FIG. 2B to the flexed orientation shown in FIG. 2A while continuing to slide along the seal member 114. As the door 20 continues to slide along the seal member 114 toward the closed position, the portion of the seal member 114 in the flexed orientation increases in length until the door 20 reaches the closed position. When the door 20 is in the closed position, substantially the entire seal member 114 is in the flexed orientation and a substantially vertical seal exists between the interior face 21 and the seal member 114 at the seal interface 24. While the interior face 21 and seal member 114 remain in contact, as shown in FIG. 2A, the interface 24 can be maintained, at least in part, by the resiliency of the seal member 114 that biases the seal member 114 toward the orientation shown in FIG. 2B.

In some embodiments, the brackets 112 can include rigid flanges that can releasably engage portions of seal members 114 to maintain the seal members 114 in desired locations and urge the seal members 114 into desired orientations. For example, each of the brackets 112 can include the rigid flanges 113a and 113b substantially along the entire length of the brackets 112 (e.g., except for a discontinuity near the midpoint, described in more detail in connection with FIGS. 3A-3B). The flanges 113a and 113b can frictionally maintain the seal members 114 substantially stationary within the brackets 112, while allowing them to be slidably removed when desired (described in more detail in connection with FIGS. 3A-3B). The curved flanges 113a can extend generally away from the side walls 12 of the trailer 10 and toward the door 20 (e.g., toward the rear of the trailer 10) when the door 20 is in the closed position. The channel flanges 113b can each at least partially define a sliding channel for slidably receiving a mounting portion 117 of a corresponding side seal member 114.

As shown in FIG. 2A, the curved flange 113a has a generally rigid construction and can act upon a flap portion 115 of seal member 114 in such a way as to urge the flap portion 115 toward the relaxed orientation shown in FIG. 2B. As the seal member 114 transitions to the flexed orientation (e.g., as the door 20 comes into contact with the seal member 114), the rigid flange 113a can impart a force on the flap portion 115 of the seal member 114, thus biasing the seal member 114 to abut the door 20 and maintain the seal interface 24.

While the seal member 114 is shown in only the flexed (FIG. 2A) and relaxed (FIG. 2B) orientations, the seal member 114 can resiliently flex to other orientations not shown. For example, an upper portion of the seal member 114 can be in contact with the door 20 (as shown in FIG. 2A), while a lower portion is not in contact with the door 20. As such, the upper portion of the seal member 114 may be in the orientation shown in FIG. 2A, the lower portion of the seal member 114 may be in the orientation shown in FIG. 2B, and an intermediate portion of the seal member 114 may be in transition between these two orientations. In another example, due to the flexibility of the seal member 114, it can be flexed beyond the range of orientations bounded by the examples shown in FIGS. 2A and 2B. This can be advantageous in maintaining the interface 24 when the door 20 moves relative to the trailer 10 (described in more detail below).

As previously described, when the trailer 10 is in motion, forces act upon the trailer 10 and door 20 to cause them to move relative to each other and vary the size and location of the side gap 27. For example, rough roads can cause the trailer 10 to vibrate or move in an uneven manner. This motion can cause the door 20 to translate relative to the trailer 10 (e.g., translate up/down and forward/backward, side-to-side, and the like) while still being attached to the track 25 and being maintained in the closed configuration. These motions have the effect of substantially altering the size and location of the gaps (e.g., the gaps 27). Under these conditions, the configuration of the seal members 114 (e.g., size, resiliency, mounting location, location of the interface 24, and the like) may allow the system 100 to reduce leakage of condition air through the gaps 27 when the door 20 and trailer 10 move relative to each other. For example, since the interface 24 may not be located directly at the side edges 22 of the door, the influence of the size and location of the gap 27 on the interface 24 is reduced and the seal interface 24 can be maintained during a wide variety of movements.

Figures 3A, 3B:
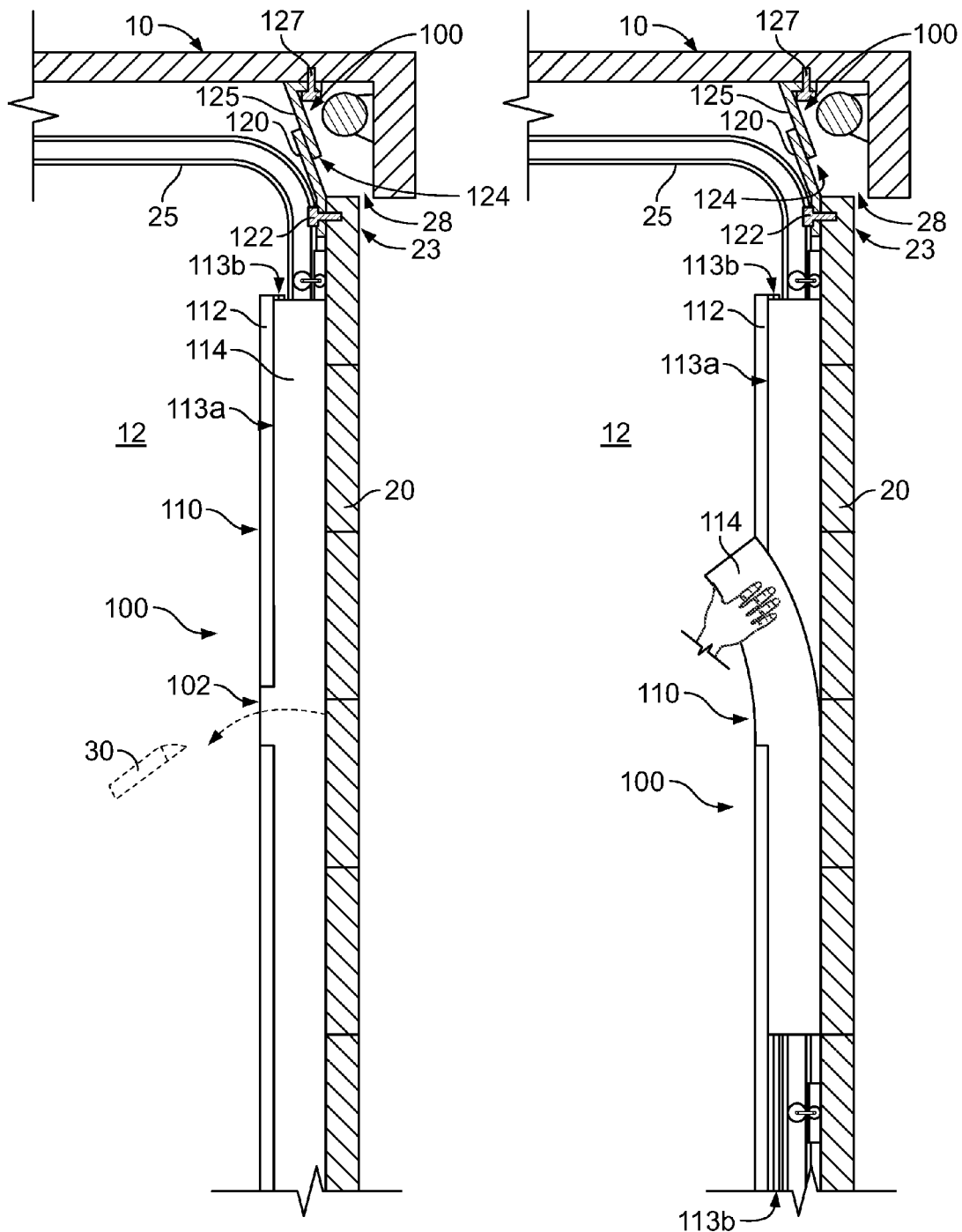
FIGS. 3A-3B are cross-sectional side views of the door seal system of FIG. 1, with a side seal member being removed, in accordance with some embodiments.

Referring now to FIGS. 3A-3B, the seal assemblies 110 can be configured to include features that allow the seal members 114 to be promptly replaced, when desired, without the use of a fastener tools, ladders, and the like. In some embodiments, each of the side seal members 114 can be slidably removed from the corresponding bracket 112 in a toolless manner. For example, a middle portion of the side seal member 114 can be pulled away (e.g., with a user's hand) from the bracket 112 at an open profile portion 102 of the bracket 112. The open profile portion 102 of the bracket 112 may serve as a discontinuity in the profile of the bracket 112 so that the flanges 113a-b (FIGS. 2A-B) of the bracket 112 are not present to frictionally engage the seal member 114. As such, the side seal member 114 can be readily grasped and removed from the bracket 112 in a toolless manner, thereby eliminating labor time and costs associated with removal and insertion of rivets or other fasteners along the side wall 12 of the trailer 10. The top and bottom portions of the side seal member 114 can pass through the open profile portion 102 of the bracket during the toolless removal process.

Optionally, in some embodiments, the user may elect to cut the middle portion of the side seal members 114 using a cutting blade 30 so that the side seal member can be promptly removed in two separate halves. As shown in FIGS. 3A-B, the open profile portion 102 of each bracket 112 can be arranged near the midpoint in the vertical length of the brackets 112. To replace one of the seal members 114, a user can use the optional cutting blade 30 to divide the seal member 114 into two portions by cutting perpendicular to the vertical length of the seal member 114 in the vicinity of the opening 102, as shown in FIG. 3A. With the seal member 114 divided in two portions, a user can remove a lower portion of the seal member 114, followed by removing the remaining upper portion of the seal member 114, as shown in FIG. 3B. The user can grasp the lower portion of the seal member 114 and remove it from the bracket 112 by sliding it up and out of the bracket 112 through the opening 102. Once the lower portion is removed, the upper portion can be removed in a similar manner by sliding it down and out of the bracket 112 through the opening 102. In this way, the seal members 114 can be removed without the use of fastener tools, or a ladder, thus reducing the time spent by a user in replacing the seal members 114. In other embodiments, the side seal member 114 can be pulled from the open profile portion 102 without cutting the seal member. In either case (cutting or no cutting), the both the top and bottom portions of the side seal member are toollessly removed from the bracket 112 in a sliding motion through open profile portion 102.

In some embodiments, the seal assemblies 110 can be configured to include features that allow the seal members 114 to be promptly replaced, when desired, without maintaining the door 20 in the open position while replacing the seal members 114. In some circumstances, it may not be convenient to maintain the door 20 in an open configuration while replacing the seal members 114. For example, a user may determine that one or both of the seal members 114 are damaged or worn such that the ability of the seal member 114 to form a suitable seal interface is reduced (e.g., there may exists gaps in the interface 24 shown in FIG. 2A). Since gaps in the interface 24 can cause the loss of conditioned air from the cargo space 15, it is desirable to replace the seal members 114 promptly after determining that gaps exist. As previously described, the seal members 114 can be replaced while the door 20 is in the closed configuration, replacement of the seal members 114 can be performed without the loss of conditioned air from the cargo space 15 associated with maintaining the door 20 in the open position, thereby reducing the energy required to condition the air inside the cargo space 15 and the associated costs.

Figure 4:
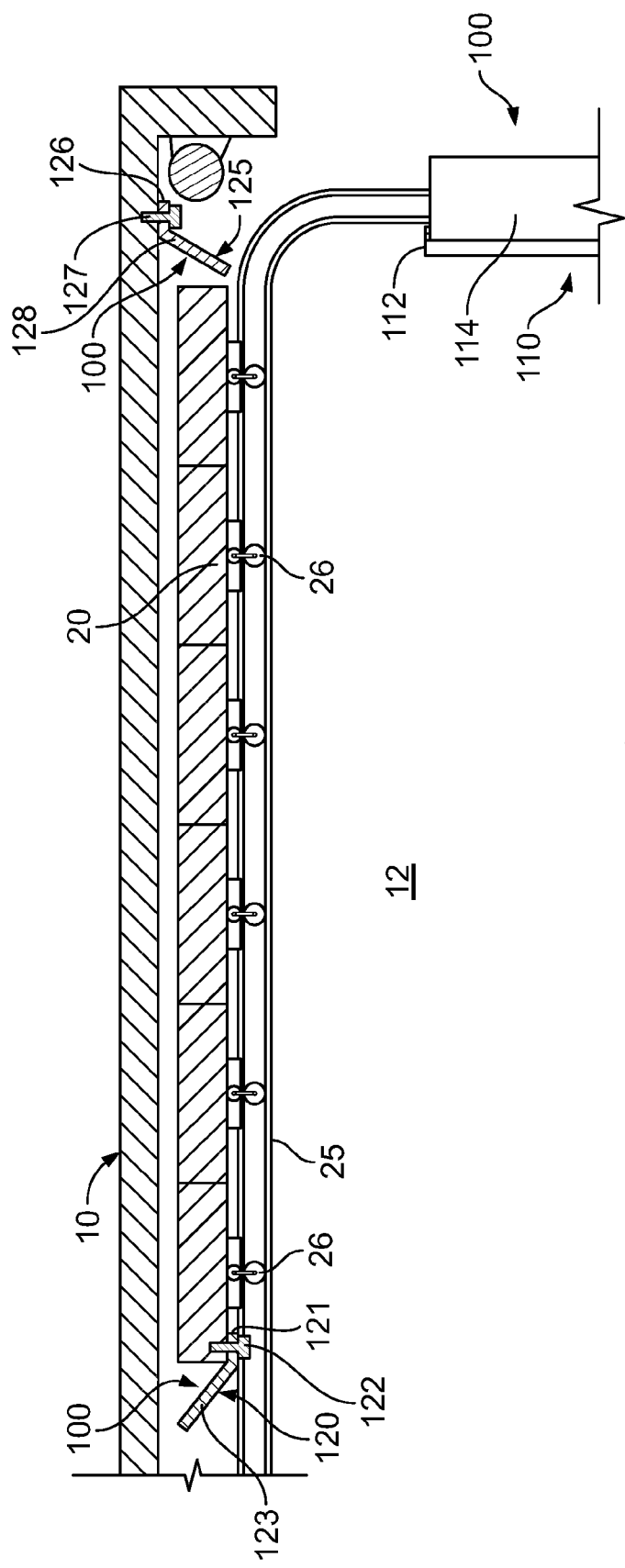
FIG. 4 is a cross-sectional side view of the door seal system of FIG. 1, with the upper mating seal members in a disengaged position, in accordance with some alternate embodiments.

Referring now to FIG. 4 and FIG. 3A, the system 100 in this embodiment has an upper door seal assembly that includes the door-mounted seal member 120 and the ceiling-mounting seal member 125. The door-mounted seal member 120 can include a flexible seal body that is fastened (e.g., the fasteners 122) in a generally horizontal orientation proximate to the top edge 23 of the trailer door 20. The corresponding ceiling-mounted seal member 125 can be fastened (e.g., using fasteners 127) to the ceiling of the trailer 10 so that the elongate body of the seal member 125 extends in a generally horizontal orientation. The upper seal members 120 and 125 can be configured such that when the access door 20 is in the closed position (as shown in FIG. 3A) the seal assemblies 120 and 125 can engage each other, forming the seal interface 124. The seal interface 124 can reduce the leakage of conditioned air through gaps (such as gap 28) along the top edge 23 of the overhead trailer door 20. (It should be understood that the air gap 28 depicted in FIG. 3A is not necessarily to scale, but is enlarged for illustrative purposes only.) When desired (e.g., when one or both of the upper seal members 120 and 125 become worn) the individual seal members 120 and 125 can be removed by removing the fasteners 122 and 127, respectively. New seal assemblies 120 and 125 can then be replaced and secured in the generally horizontal orientation with new fasteners 122 and 127.

In some embodiments, the seal members 120 and 125 can comprise flexible polymeric materials such as nylon, PVC, nylon reinforced PVC, nitrile PVC, vulcanized rubber, polyethylene, urethane, urethane PVC blends, ethyl vinyl acetate (EVA), thermoplastic elastomers, thermoplastic vulcanizate (TPV), ethylene propylene diene M-class rubber (EPDM), EPDM TPV, polyester, polyolefin elastomer (POE), and combinations of the above. The seal members 120 and 125 can also include features that can cooperate with the fasteners 127 to mount the seal members 120 and 125. For example, the seal members 120 and 125 can include metal inserts (not shown) through which the fasteners 122 and 127 pass (e.g., to strengthen the assemblies 120 and 125 near the locations of the fasteners 122 and 127). In another example, the seal members 120 and 125 can include one or more elongate brackets (not shown) through which one or more of the fasteners 122 and 127 pass (e.g., to strengthen the assemblies 120 and 125 near the locations of the fasteners 122 and 127). Inserts and brackets of this kind can be made of, for example, metal, a rigid polymeric material, or the like.

As shown in FIG. 4, the door-mounted upper seal member 120 in this embodiment includes a cross-sectional profile having at least two portions. For example, the seal member 120 can include a mounting portion 121 having a generally flat surface to abut against a surface of the access door 20. The fasteners 122 can pass through the mounting portion 121 to secure the seal member 120 to the access door 20 proximate to the top edge 23. Also, the profile of the seal member 120 can include a seal flap portion 123 that extends transversely from the mounting portion 121. The seal flap portion 123 can engage with a corresponding portion 128 of the ceiling-mounted seal member 125 when the access door 20 is adjusted to the closed position (refer, for example, to FIG. 3A). In such circumstances, the seal flap portion 123 of the seal member 120 may resiliently adjust from a relaxed position (refer, for example, to FIG. 4) to a flexed position (refer, for example, to FIG. 3A) in response to contact with the ceiling-mounted member 125.

Still referring to FIG. 4, the ceiling-mounted upper seal member 125 in this embodiment also includes a cross-sectional profile having at least two portions. For example, the seal member 125 can include a mounting portion 126 having a generally flat surface to abut against a surface of the trailer 10. The fasteners 127 can pass through the mounting portion 126 to secure the seal member 125 to the trailer 10 (e.g., the ceiling of the trailer 10 in this embodiment). Also, the profile of the seal member 120 can include a seal flap portion 128 that extends transversely from the mounting portion 126 in a direction away from the ceiling of the trailer 10. The seal flap portion 128 can engage with the corresponding portion 123 of the door-mounted seal member 120 when the access door 20 is adjusted to the closed position (refer, for example, to FIG. 3A). In such circumstances, the seal flap portion 128 of the seal member 125 may resiliently adjust from a relaxed position (refer, for example, to FIG. 4) to a flexed position (refer, for example, to FIG. 3A) in response to contact with the door-mounted member 125.

When the corresponding seal flap portions 123 and 128 engage one another, the seal interface 124 may be formed so as to reduce the leakage of conditioned air along the upper air gap 28. For example, in some circumstances, the seal members 120 and 125 can engage each other at the substantially horizontal interface 124 (e.g., that continues substantially the entire length of the seal assemblies 120 and 125) and exert substantially equal and opposite forces against each other, thus forming a resilient seal at the interface 124. The seal interface 124 can block or reduce the leakage of cooled or otherwise conditioned air from the cargo space 15 out to the exterior of the trailer 10 through the one or more top air gaps (e.g., the top air gap 28).

In use, the access door 20 can be in the open position (shown in FIG. 4), such that the seal members 120 and 125 do not engage each other. As the door 20 is transitioned from the open position to the closed position, the seal member 125 can flexibly bend to allow the door 20 to travel past the seal member 125 without damaging either the door 20 or the seal member 125. As the door passes beyond the seal member 125, at least a portion of the seal member 120 can engage at least a portion of the seal member 125, causing them to resiliently flex from the relaxed orientations shown in FIG. 4 to the flexed orientations shown in FIG. 3A. When the door 20 is in the closed position, substantially the entirety of the seal flap portions 123 and 128 are in the flexed orientations and the substantially horizontal seal interface 124 is formed between the seal members 120 and 125. While the seal members 120 and 125 remain in contact, as shown in FIG. 3A, the interface 124 can be maintained, at least in part, by the resiliency of the seal members 120 and 125 that biases the seal flap portions 123 and 128 toward one another. When the door 20 is opened, the seal members 120 and 125 can resiliently return to the orientations shown in FIG. 4.

As described previously, while the trailer is in motion the door 20 can translate relative to the trailer 10, thereby substantially altering the size and location of the gaps (e.g., the upper gap 28). Under these conditions, the configuration of the seal members 120 and 125 (e.g., size, resiliency, mounting location, location of the interface 124, and the like) can allow the system 100 to continue to reduce the leakage of air through the gap 28 even when the door 20 and trailer 10 move relative to each other. For example, since the interface 124 may not be located directly upon the top edge 23 of the door, the influence of the size and location of the gap 28 on the interface 124 is reduced and the interface 124 can be maintained during a wide variety of access door movements.

A number of embodiments of the invention have been described. Nevertheless, it will be understood that various modifications may be made without departing from the spirit and scope of the invention. Accordingly, other embodiments are within the scope of the following claims.

What is claimed is:

1. A door seal system for a roll-up access door in a refrigerated trailer, comprising:
    a roll-up access door movably mounted in guide tracks of a refrigerated trailer and being adjustable between an open position in which the access door is arranged in a generally horizontal elevated position and a closed position in which the access door is arranged in a generally vertical position proximate to a rear of the trailer;
    an upper seal assembly comprising a door-mounted seal member and a ceiling-mounted seal member that releasably engage one another along a generally horizontal seal interface proximate to a top edge of the access door when the access door is adjusted to the closed position;
    a first side seal assembly comprising a first generally rigid elongate bracket mounted to a first side wall of the trailer in a generally vertical orientation and a first flexible seal member slidably and removably engaged with the first generally rigid elongate bracket, wherein the first flexible seal member extends from the first generally rigid elongate bracket, over one of the guide tracks, and into contact with an interior face of the access door when the access door is in the closed position; and
    a second side seal assembly comprising a second generally rigid elongate bracket mounted to a second side wall of the trailer in a generally vertical orientation and a second flexible seal member slidably and removably engaged with the second generally rigid elongate bracket, wherein the second flexible seal member extends from the second generally rigid elongate bracket, over another of the guide tracks, and into contact with the interior face of the access door when the access door is in the closed position.

2. The system of claim 1, wherein the door-mounted seal member and the ceiling-mounted seal member of the upper seal assembly are spaced apart when the access door is adjusted to the opened position.

3. The system of claim 2, wherein each of the door-mounted seal member and the ceiling-mounted seal member includes an elongate body that comprises a flexible polymeric material and that is at least partially defined by a flange portion and a seal surface portion that extends transversely from the flange portion.

4. The system of claim 3, wherein the flange portion of the door-mounted seal member is fastened directly to the access door proximate to the top edge of the access door, wherein the flange portion of the ceiling-mounted seal member is fastened directly to the ceiling proximate to the rear of the trailer, and wherein the seal surface portion of the door-mounted seal member flexibly moves in response to contact from the seal surface portion of the ceiling-mounted seal member when the access door is adjusted to the closed position.

5. The system of claim 1, wherein the first generally rigid elongate bracket includes a channel extending generally parallel to the first side wall and a rigid flange extending generally away from the first side wall and toward the access door when the access door is in the closed position, the rigid flange urging the first flexible seal member to abut against the interior face of the access door when the access door is in the closed position.

6. The system of claim 5, wherein the first flexible seal member includes an elongate body that comprises a flexible polymeric material and that is at least partially defined by a mounting portion to slidably mate into the channel of the first generally rigid elongate bracket and a seal flap portion that extends from the mounting portion toward the interior face of the access door when the access door is in the closed position.

7. The system of claim 5, wherein the second generally rigid elongate bracket includes a second channel extending generally parallel to the second side wall and a second rigid flange extending generally away from the second side wall and toward the access door when the access door is in the closed position, the second rigid flange urging the second flexible seal member to abut against the interior face of the access door when the access door is in the closed position.

8. The system of claim 1, wherein the first and second generally rigid elongate brackets are fixedly fastened to the respective first and second side walls while the first and second flexible seal members are toollessly removable away from the first and second side walls.

9. The system of claim 8, wherein each of the first and second generally rigid elongate brackets includes a discontinuous profile portion to expose a portion of the respective first or second flexible seal member to a cutting blade.

10. A door seal system for use in a refrigerated trailer, comprising:
    a first upper seal member having a flexible elongate body at least partially defined by a door flange portion directly mountable to an interior face of an access door at a rear of a trailer and a first upper seal flap extending transversely from the door flange portion;
    a second upper seal member having a flexible elongate body at least partially defined by a ceiling flange portion directly mountable to a ceiling of the trailer and a second upper seal flap extending transversely from the ceiling flange portion, wherein the first and second seal flaps engage one another to provide a generally horizontal seal interface proximate to a top edge of the access door when the door flange portion is mounted to the access door of the trailer and the ceiling flange portion is mounted to the ceiling of the trailer;

a first side seal assembly comprising a first generally rigid elongate bracket mountable to a first side wall of the trailer and a first side seal member slidably and removably engaged within a first channel of the first generally rigid elongate bracket, wherein when the first generally rigid elongate bracket is mounted in a generally vertical orientation along the first side wall, the first side seal member extends over a first guide track and into contact with the access door in the trailer; and a second side seal assembly comprising a second generally rigid elongate bracket mountable to a second side wall of the trailer and a second side seal member slidably and removably engaged within a second channel of the second generally rigid elongate bracket, wherein when the second generally rigid elongate bracket is mounted in a generally vertical orientation along the second side wall, the second side seal member extends over a second guide track and into contact with the access door in the trailer.

11. The system of claim 10, wherein the first upper seal flap of the first seal member and the second upper seal flap of the second seal member flexibly adjust from a relaxed position to a flexed position when the first and second seal flaps engage one another to provide the generally horizontal seal interface.

12. The system of claim 11, wherein the door flange portion of the first seal member is attachable directly to the access door proximate to the top edge of the access door via a plurality of fasteners, and wherein the ceiling flange portion of the second seal member is attachable directly to the ceiling proximate to the rear of the trailer via a second plurality of fasteners.

13. The system of claim 12, wherein the first upper seal flap of the first seal member and the second upper seal flap of the second seal member are biased toward when the first and second seal flaps engage one another to provide the generally horizontal seal interface.

14. The system of claim 10, wherein the first generally rigid elongate bracket includes a rigid flange extending generally away from the first side wall and toward the access door when the first generally rigid elongate bracket is mounted along the first side wall, the rigid flange urging the first side seal member to abut against the access door.

15. The system of claim 14, wherein the first side seal member includes an elongate body that comprises a flexible polymeric material and that is at least partially defined by a mounting portion to slidably mate into the first channel of the first generally rigid elongate bracket and a seal flap portion that extends from the mounting portion toward the access door when the first generally rigid elongate bracket is mounted along the first side wall.

16. The system of claim 15, wherein the second generally rigid elongate bracket includes a rigid flange extending generally away from the second side wall and toward the access door when the second generally rigid elongate bracket is mounted along the second side wall, the rigid flange urging the second side seal member to abut against the access door.

17. The system of claim 10, wherein the first and second generally rigid elongate brackets are fixedly attachable to the respective first and second side walls using fasteners while the first and second side seal members are toollessly removable away from the first and second side walls and the first and second generally rigid elongate brackets.

18. The system of claim 17, wherein each of the first and second generally rigid elongate brackets includes an open profile portion to expose a portion of the respective first or second side seal member to a cutting blade.

19. A method of using a door seal system in a refrigerated trailer, comprising:

mounting a first upper seal member to an access door in a rear portion of a trailer, the first upper seal member having a flexible elongate body at least partially defined by a door flange portion directly mounted to the access door and a first upper seal flap extending transversely from the door flange portion;

mounting a second upper seal member to a ceiling of the trailer, the second upper seal member having a flexible elongate body at least partially defined by a ceiling flange portion mounted to the ceiling and a second upper seal flap extending transversely from the ceiling flange portion;

mounting a first side seal assembly to a first side wall of the trailer proximate to a first guide track for the access door, the first side seal assembly comprising a first generally rigid elongate bracket mounted to the first side wall of the trailer and a first side seal member slidably and removably engaged within a first channel of the first generally rigid elongate bracket;

mounting a second side seal assembly to a second side wall of the trailer proximate to a second guide track for the access door, the second side seal assembly comprising a second generally rigid elongate bracket mounted to the second side wall of the trailer and a second side seal member slidably and removably engaged within a second channel of the second generally rigid elongate bracket;

adjusting the access door of the trailer to a closed position so that the first and second upper seal flaps engage one another to provide a generally horizontal seal interface proximate to a top edge of the access door, wherein the first side seal member extends over the first guide track and into contact with the interior face of the access door when the access door is adjusted to the closed position, and wherein the second side seal member extends over the second guide track and into contact with the interior face of the access door when the access door is adjusted to the closed position.

20. The method of claim 19, further comprising toollessly removing the first and second side seal members away from the first and second side walls and the first and second generally rigid elongate brackets while the first and second generally rigid elongate brackets remain fixedly mounted to the respective first and second side walls.

* * * * *